United States Patent
Liu et al.

(10) Patent No.: US 8,493,431 B2
(45) Date of Patent: Jul. 23, 2013

(54) VIDEO CONFERENCE SYSTEM, PROCESSING METHOD USED IN THE SAME, AND MACHINE-READABLE MEDIUM

(75) Inventors: Liyan Liu, Beijing (CN); Xiaomeng Wang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 210 days.

(21) Appl. No.: 12/929,386

(22) Filed: Jan. 20, 2011

(65) Prior Publication Data

US 2011/0205330 A1    Aug. 25, 2011

(30) Foreign Application Priority Data

Feb. 25, 2010   (CN) .......................... 2010 1 0116447

(51) Int. Cl.
*H04N 7/142*    (2006.01)
(52) U.S. Cl.
USPC .................... 348/14.08; 348/14.12; 348/14.13
(58) Field of Classification Search
USPC .......... 348/14.01–14.16; 375/240.01, 240.03, 375/240.16
See application file for complete search history.

(56) References Cited

U.S. PATENT DOCUMENTS

| 5,512,939 A | 4/1996 | Zhou |
| 2004/0054724 A1* | 3/2004 | Sudo .............................. 709/204 |
| 2005/0013309 A1* | 1/2005 | Ravishankar et al. ......... 370/401 |
| 2005/0140781 A1* | 6/2005 | Chi et al. .................... 348/14.13 |
| 2006/0215753 A1 | 9/2006 | Lee et al. |
| 2008/0259154 A1 | 10/2008 | Garrison et al. |
| 2010/0166055 A1* | 7/2010 | Schmit et al. ............. 375/240.01 |

FOREIGN PATENT DOCUMENTS

| CN | 1118961 A | 3/1996 |
| WO | WO-2007007257 A1 | 1/2007 |

OTHER PUBLICATIONS

Feb. 16, 2013 Office Action in related Chinese Patent Application No. 201010116447.7 and English language translation of the same.

* cited by examiner

*Primary Examiner* — Melur Ramakrishnaiah
(74) *Attorney, Agent, or Firm* — Harness, Dickey & Pierce, P.L.C.

(57) ABSTRACT

Disclosed is a processing method used in a video conference system having a local terminal device and at least one remote terminal device, comprising a feature detection step of carrying out a feature detection in the local terminal device and the remote terminal device, respectively; a conference mode setting step of setting a conference mode for the local terminal device and the remote terminal device, respectively; and a video encoding step of dividing a video frame in the local terminal device and the remote terminal device, and then pre-processing the divided areas so as to encode the pre-processed areas, respectively.

13 Claims, 6 Drawing Sheets

FIG.6A $$\frac{1}{8}\begin{bmatrix} 0 & 1 & 0 \\ 1 & 4 & 1 \\ 0 & 1 & 0 \end{bmatrix}$$

FIG.6B $$\frac{1}{25}\begin{bmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{bmatrix}$$

FIG.6C $$I_i(x,y) = \begin{cases} I_i(x,y), & \text{if } (x,y) \in \text{AREA OF CONCERN} \\ (I_i(x,y) + I_{i-1}(x,y))/2, & \text{if } (x,y) \in \text{EXTENDED AREA OF CONCERN} \\ I_{i-1}(x,y), & \text{if } (x,y) \in \text{AREA OF UNCONCERN} \end{cases}$$

VIDEO CONFERENCE SYSTEM, PROCESSING METHOD USED IN THE SAME, AND MACHINE-READABLE MEDIUM

BACKGROUND OF THE INVENTION

1. Field of the Invention

The present invention relates to a video conference system, a processing method used in the same, and a machine-readable medium, and more particularly relates to a video conference system, a processing method of processing at least one area of concern in the video conference system, and a machine-readable medium having machine-executable instructions for realizing the processing method.

2. Description of the Related Art

Since a network-based video conference can drastically cut down the time and cost of a conference organizer, with the developments of technologies, the network-based video conference has been spreading fast (particularly in the business field) in recent years. Therefore various improvement proposals on improving sound quality, image quality, etc., have been made so far.

For example, in the below cited reference No. 1, a technical proposal used for simulating an effect of shallow depth of field by dealing with a captured image or video is disclosed. In this method, the background of the image is separated out, and then a focus area (for example, a talker) is emphasized by applying fuzzy processing to the background. It is possible to utilize a convolution filter (for example, a median filter, an averaging filter, a Gaussian filter, etc.) in a region of space to carry out the fuzzy processing; it is also possible to utilize a frequency filer (for example, a low-pass filter) in a region of frequency to carry out the fuzzy processing.

In the below cited reference No. 2, another technical proposal is made. In this proposal, a method and a device having a function of transformation along the time-line of a video are disclosed. As for an area of concern, this method uses a frame rate higher than that of an area of unconcern; as for an extended area of concern, this method uses a fuzzy filter.

Furthermore, in the below cited reference No. 3, a processing technique able to pay attention to an area of concern in a video teleconference is provided. In this processing technique, a receiving unit of a local terminal device transmits information of an area of concern to a sending unit of the remote terminal device. The sending unit of the remote terminal device applies high-priority encoding to an area of concern in a scene of a video by employing the information of the area of concern transmitted by the receiving unit of the local terminal device. Therefore the receiving unit of the local terminal device can remotely control the encoding of the area of concern in the video of the sending unit of the remote terminal device.

However the above-mentioned techniques still have various problems. For example, in the below cited reference No. 1, the method intends to realize privacy protection in a cellphone having a camera by carrying out the fuzzy processing, but is not used for a scene in a video conference. Therefore the features of the scene in the video conference are not properly processed in the method. For example, the method does not consider participants, a common focus area of concern of all the participants in the video conference at any time, optimum allocation and utilization of network bandwidth, etc.

Furthermore, for example, in the below cited reference No. 2, the technical proposal only considers letting its method be used at one end (i.e. one terminal device) of a video conference system, but does not consider the two ends of the video conference system nor optimum allocation and utilization of available network bandwidth. Aside from this, the area of concern is defined only by using a single rule; that is, a person in the video is defined as an area of concern.

Furthermore, in the below cited reference No. 3, the processing technique does not set an area of concern of a video conference. And when separating an area of concern and area of unconcern, the processing technique only considers video at one end of a video conference system, but does not consider the two ends of the video conference system.

Cited Reference No. 1: US Patent Application Publication NO. 2008/0259154 A1

Cited Reference No. 2: International Publication No. WO 2007/007257 A1

Cited Reference No. 3: US Patent Application Publication NO. 2006/0215753 A1

SUMMARY OF THE INVENTION

In the above-mentioned conventional techniques, only the video at one end of the video conference system is considered independently; however the features of video at two ends of the video conference system and the optimum allocation of network bandwidth are not be comprehensively considered, and only a single rule is considered when defining the area of concern (i.e., the person in the scene is defined as the area of concern).

In order to overcome the disadvantages of the prior art, the aim of the present invention is to propose a video conference system, a processing method used in the video conference system for processing at least one area of concern in the video conference system, and a machine-readable medium for realizing the processing method.

According to one aspect of the present invention, a processing method of processing at least one area of concern in a video conference system including a local terminal device and at least one remote terminal device is provided. The processing method comprises a feature detection step of, when conducting a video conference by using the video conference system, carrying out a feature detection in the local terminal device and the remote terminal device of the video conference system, respectively; a conference mode setting step of, based on the feature detection results of the local terminal device and the remote terminal device, setting a conference mode with regard to a current video conference scene in the video conference system for the local terminal device and the remote terminal device, respectively; and a video encoding step of, based on the conference mode, carrying out a division of a video frame in the local terminal device and the remote terminal device, and then pre-processing the divided areas so as to carry out video encoding for encoding the pre-processed areas, respectively.

According to another aspect of the present invention, a video conference system is provided. The video conference system comprises a local terminal device and at least one remote terminal device. During a video conference conducted by using the video conference system, the local terminal device and the remote terminal device carry out feature detection, respectively; information related to the feature detection is transmitted between the local terminal device and the remote terminal device, and a conference mode with regard to a current video conference scene in the video conference system is set, based on the feature detection results of the local terminal device and the remote terminal device, for the local terminal device and the remote terminal device, respectively; and a division of a video frame, based on the current conference mode, is carried out in the local terminal device and the remote terminal device, and then the divided areas are pre-processed so as to carry out video encoding for encoding the pre-processed areas, respectively.

Furthermore, according to one more aspect of the present invention, another video conference system is provided. The video conference system comprises a local terminal device; at least one remote terminal device; and a video conference control device. During a video conference conducted by using the video conference system, the local terminal device and the remote terminal device carry out feature detection, respectively; the local terminal device and the remote terminal device send information related to the feature detection to the video conference control device, and the video conference control device sets, based on the feature detection results of the local terminal device and the remote terminal device, a conference mode with regard to a current video conference scene in the video conference system for the local terminal device and the remote terminal device, respectively; the video conference control device sends information related to the set conference mode to the local terminal device and the remote terminal device, the local terminal device and the remote terminal device carry out a division of a video frame based on the current conference mode, and then pre-process the divided areas so as to carry out video encoding for encoding the pre-processed areas, respectively.

According to one more aspect of the present invention, a non-transitory machine-readable medium having machine-executable instructions for execution by a processing system is provided. The machine-executable instructions are used for processing at least one area of concern in a video conference system including a local terminal device and at least one remote terminal device. The machine-executable instructions, when executed, cause the processing system to carry out a feature detection step of, when conducting a video conference by using the video conference system, carrying out feature detection in the local terminal device and the remote terminal device of the video conference system, respectively; a conference mode setting step of, based on the feature detection results of the local terminal device and the remote terminal device, setting a conference mode with regard to a current video conference scene in the video conference system for the local terminal device and the remote terminal device, respectively; and a video encoding step of, based on the conference mode, carrying out a division of a video frame in the local terminal device and the remote terminal device, and then pre-processing the divided areas so as to carry out video encoding for encoding the pre-processed areas, respectively.

In the embodiments of the present invention, two ends (i.e. the local terminal device and the remote terminal device) of the video conference are considered as a whole; based on the feature detection results in the two ends of the video conference, and processing such the division of video frames, the pre-processing applied to the divided areas is carried out. Furthermore a bit re-allocation is carried out at two levels (one is the level of video frames; another is the level of participants in a video conference (i.e. level of the local terminal device and the remote terminal device)), respectively, so that system resource can be optimized.

Furthermore since different video conference scenes have different features (for example, a speech, a discussion, etc.) during the whole period of the video conference, the video conference is divided into various conference modes based on the feature detection results of the local terminal device and the remote terminal device. Then based on the conference mode, an area of concern is taken out by carrying out a division of video frames in the two ends of the video conference system, respectively. In the embodiments of the present invention, definition and selection of areas of concern are closely associated with the conference mode; therefore compared to the definition of areas of concern using the single rule in the conventional techniques, the technical proposal in the embodiments of the present invention can result in consistently presenting more clear and more accurate focus to the participants in the different video conference scenes.

By the above-mentioned way, it is possible not only to improve the quality of the video conference by setting suitable conference modes according to the feature detection carried out in the two ends of the video conference system, respectively, but also to carry out the bit re-allocation so as to improve the performance of the video conference system according to the feature detection and the conference modes.

Furthermore, in the embodiments of the present invention, user interactivity is introduced in the whole system; that is, it is possible to adjust the quality of the video by adjusting parameters.

BRIEF DESCRIPTION OF THE DRAWINGS

FIGS. 6A~6C illustrate examples of filtering in a region of space and a region of time.

DETAILED DESCRIPTION OF THE PREFERRED EMBODIMENTS

Hereinafter, various embodiments of the present invention will be concretely described with reference to the drawings. However it should be noted that the same symbols, which are in the specification and the drawings, stand for constructional elements having the basically-same function and structure, and repeated explanations for the constructional elements are omitted.

Figure 1:
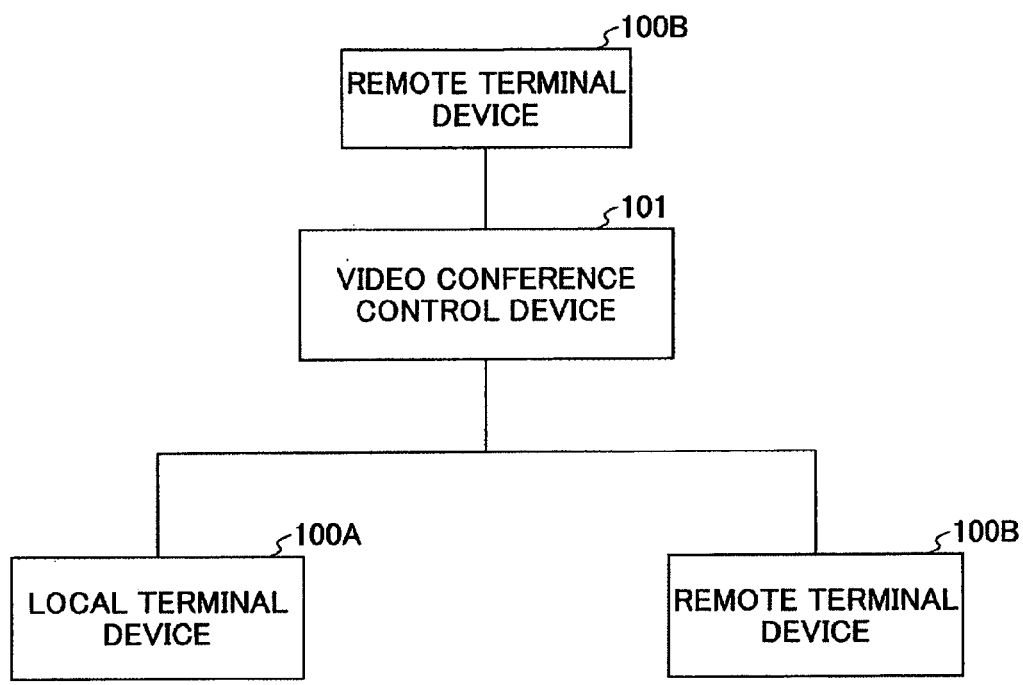
FIG. 1 is a block diagram of a video conference system according to an embodiment of the present invention.

FIG. 1 is a block diagram of a video conference system according to an embodiment of the present invention.

In FIG. 1, the video conference system of the embodiment of the present invention comprises plural terminal devices 100 and a video conference control device 101 connected to the plural terminal devices 100. As shown in FIG. 1, the plural terminal devices 100 may be divided into a local terminal device 100A and two remote terminal devices 100B based on positions of users. In the below description, if it is not necessary to divide the plural terminal devices 100 into the local terminal device 100A and the remote terminal device 100B, the local terminal device 100A and the remote terminal devices 100B may be collectively called the terminal devices 100. Each of the terminal devices 100 may be formed by any terminal able to support a video conference; an example of the terminal includes a personal computer (PC), a mobile terminal (for example, a cell phone, etc.), a personal digital assistance (PDA), etc. Furthermore, for example, the video conference control device 101 may be formed by a server, a general-purpose personal computer, etc. Here it should be noted that although one local terminal device 100A and two remote terminal devices 100B are shown in FIG. 1, it is apparent that the numbers of the local terminal device and the remote terminal device are not limited to those shown in FIG. 1.

Furthermore each of the terminal devices 100 may further comprise an internal or external video capture unit (for example, a camera) so as to cause each of the terminal devices 100 to be able to carry out an operation of building or adding a video conference.

Figure 2:
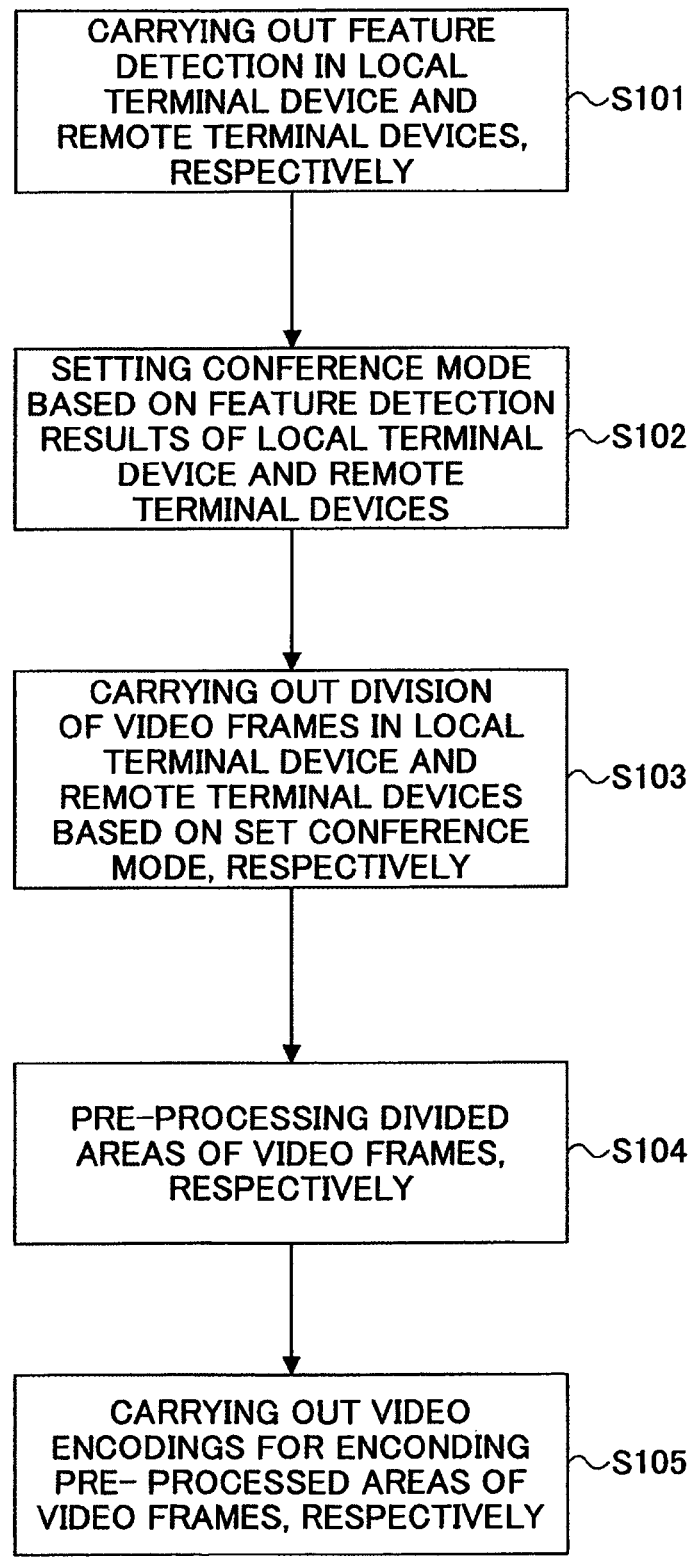
FIG. 2 is a flowchart of a processing method of the video conference system according to the embodiment of the present invention.

FIG. 2 is a flowchart of a processing method of the video conference system according to the embodiment of the present invention.

First a video conference is built among the terminal devices 100 by using the video conference control device 101. Since it is a conventional technique to build a video conference among the terminal device 100s, here the concrete description about how to build the video conference among the terminal devices 100 is omitted. However it should be noted that the connection among the terminal devices 100 of the video conference system may be realized by any connection approach such as a wired connection approach, a wireless connection approach, etc.

After the video conference is built among the terminal devices 100, in STEP S101, a feature detection of video frame is carried out in the terminal devices 100, respectively.

Then, in STEP S102, the terminal devices 100 send information related to the feature detection result to the video conference control device 101, and the video conference control device 101 sets a conference mode with respect to a current video conference scene of the terminal devices 100 in the video conference system entirely based on the feature detection results of the local terminal device 100A and the remote terminal devices 100B (i.e., the feature detection results of the local terminal device 100A and the remote terminal devices 100B are considered as a whole). Here it should be noted that technical terms "local terminal device" and "remote terminal device" are determined according to a positional relationship of users and the terminal devices 100. For example, for a user on one of the remote terminal devices 100B as shown in FIG. 1, this remote terminal device 100B is the local terminal device, whereas the local terminal device 100A and another one of the remote terminal devices 100B are the remote terminal devices.

Then, in STEP S103, the terminal devices 100 in the video conference system, based on the set conference mode, carry out a division of video frame in the terminal devices 100 (i.e. the local terminal device 100A and the remote terminal devices 100B), respectively.

After the division of the video frame carried out in each of the terminal devices 100 finishes, in STEP S104, each of the terminal devices 100 pre-processes the divided areas, and carries out video encoding for encoding the pre-processed areas. Then the encoded areas of each of the terminal devices 100 are sent to the other two terminal devices 100.

In what follows, respective steps in the processing method of the video conference system according the embodiment of the invention will be concretely described.

First the feature detection process carried out in each of the terminal devices 100 is illustrated as follows.

Figure 3:
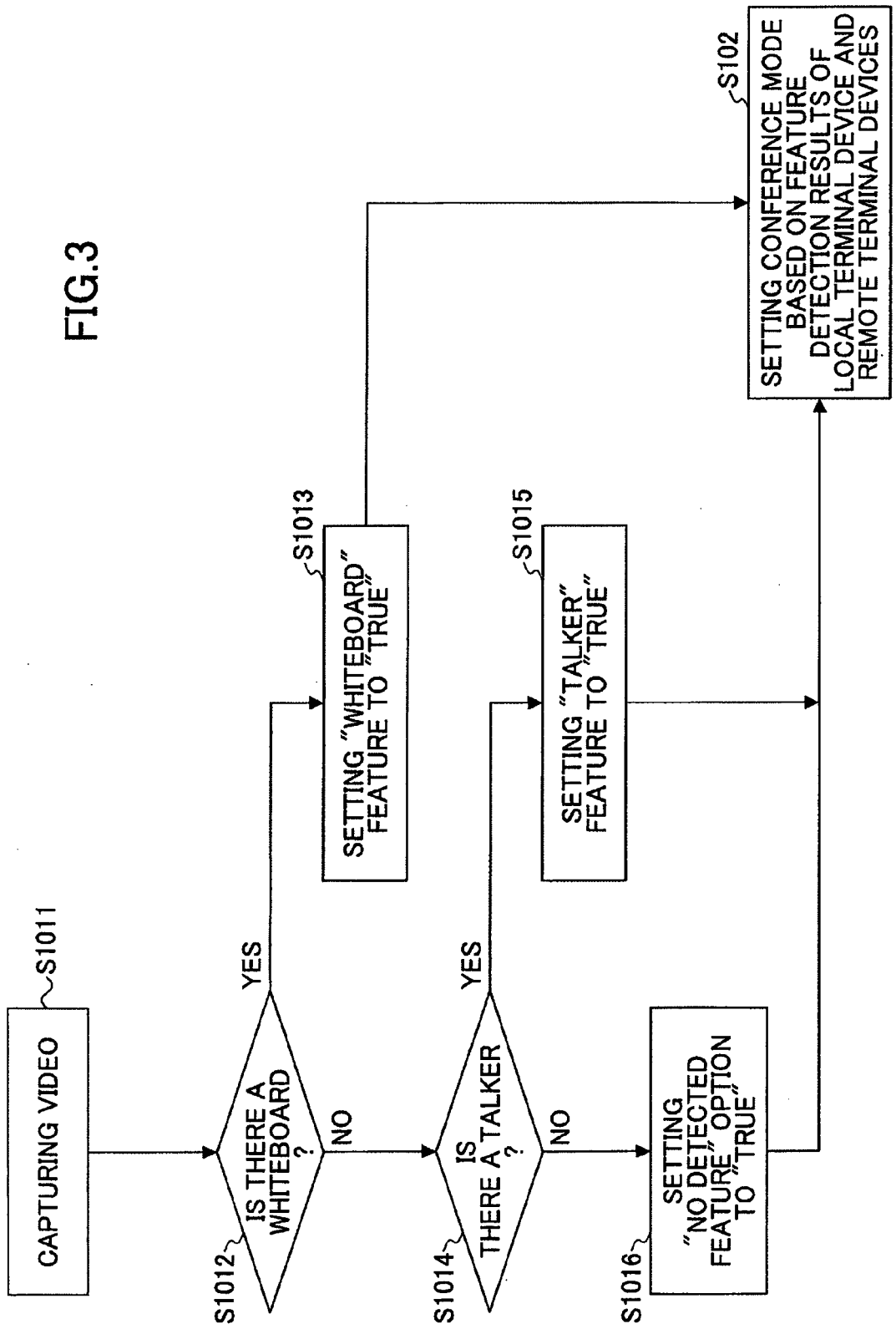
FIG. 3 is a flowchart of a feature detection process of the video conference system.

FIG. 3 is a flow chart of the feature detection process. The feature detection process carried out in each of the terminal devices 100 of the video conference system includes following steps.

For example, after building a video conference, in STEP S1011, each of the terminal devices 100 utilizes an internal or external capture unit (for example, a camera, etc.) or the like to capture a video.

Then, in STEP S1012, each the terminal devices 100 first determines whether there is a whiteboard area in a created current video frame, and then calculates a ratio of the whiteboard area to the whole video frame are based on the result of determining whether there is a whiteboard in the current video frame. In a case where it is determined that there is at least one whiteboard area in the current video frame, if the ratio of the planar area of all the whiteboards to the planar area of the whole video frame is greater than or equal to a predetermined threshold value, then the feature detection process goes to STEP S1013, whereas if the ratio of the planar area of all the whiteboards to the planar area of the whole video frame is less than the predetermined threshold value, then the feature detection process goes to STEP S1014. Furthermore in a case where it is determined that there is no whiteboard area in the current video frame, the feature detection process goes to STEP S1014 too.

In STEP S1013, the whiteboard is recognized as the feature of the current video frame, i.e., a "WHITEBOARD" feature is set to "TRUE". That is, participants in the video conference are making a presentation or an explanation by using the whiteboard.

If it is determined that there is no whiteboard area in the current video frame, or if the ratio of the planar area of all the whiteboards to the planar area of the whole video frame is less than the predetermined threshold value, the feature detection process goes to STEP S1014, and continues to detect other features in the current video frame. In this embodiment, it is determined at this time whether there is a talker in the current video frame. If it is determined that there is a talker, the feature detection process goes to STEP S1015; otherwise the feature detection process goes to STEP S1016.

If it is determined that there is a talker in the current video frame, a "TALKER" feature in the current video frame is set to "TRUE" in STEP S1015. That is, a talker has been detected in the current video frame.

If it is determined that there is no talker in the current video frame, a "NO DETECTED FEATURE" option in the current video frame is set to "TRUE". That is, there is no detected feature in the current video frame.

It should be noted that the above-mentioned feature detection process is carried out in each of the terminal devices 100, and then the conference mode is set for all of the terminal devices 100 based on the features detected in each of the terminal devices 100.

Next how to set the conference mode based on the features detected in each of the terminal devices 100 is illustrated as follows.

After the feature detection carried out in each of the respective terminal devices 100 of the video conference system finishes, each of the respective terminal devices 100 sends information related to the features of the current video frame to the video conference control device 101 based on any protocol for transferring data (for example, the TCP/IP protocol, the UDP protocol, etc.).

After the video conference control device 101 receives the information related to the features of the current video frame of each of the terminal devices 100, the video conference control device 101 combines the information related to the features of the current video frame of each of the terminal devices 100, and sets the conference mode of the current video conference scene for all of the terminal devices 100 based on the combined result.

For example, if the "WHITEBOARD" feature is set to "TRUE" in the local terminal device 100A and the "NO DETECTED FEATURE" option is set to "TRUE" in the remote terminal devices 100B, the video conference control device 101 sets the conference mode of the current video conference scene to a "whiteboard mode" based on the above-mentioned information. Furthermore if a talker is continuously detected in the local terminal device 100A during a predetermined time period (it should be noted that the predetermined time period may be changed according to an actual situation) and there is no detected feature in the remote control devices 100B, the video conference control device 101 sets the conference mode of the current video conference scene to a "presentation mode" based on the above-mentioned information. Aside from these, if plural talkers are simultaneously or successively detected at two ends (for example, the local terminal device 100A and the remote terminal devices 100B) of the video conference system during a predetermined time period, the video conference control device 101 sets the conference mode of the current video conference scene to a "discussion mode" based on the above-mentioned information.

How to set the conference mode of each of the terminal devices 100 (i.e. the local terminal device 100A and the remote terminal devices 100B) according to the features of the video frame of each of the terminal devices 100 is not limited to the above-mentioned cases; for example, it is possible to flexibly set more conference modes based on more concrete circumstances. Furthermore users or participants of the video conference may also arbitrarily restrict a conference mode by using an input and output interface (not shown in the drawings) of the video conference control device 101 according to actual situations. For example, in a circumstance where the "whiteboard" feature in the local terminal device 100A is set to "TRUE" and a talker is continuously detected in one of the plural remote terminal devices 100B during a predetermined time period, the video conference control device 101 may set the mode of the current video conference scene to the "whiteboard mode" or the "presentation mode" based on the setting of the user. Again, for example, in a circumstance where the "whiteboard" feature in the local terminal device 100A is set to "TURF" and talkers are continuously detected in the plural remote terminal devices 100B, the video conference control device 101 may set the mode of the current video conference scene to the "discussion mode".

After the corresponding conference mode is set by the video conference control devices 101 based on the features of the video frame of each of the terminal devices 100 (i.e. the local terminal device 100A and the remote terminal devices 100B), the video conference control device 101 sends information related to the set conference mode to the respective terminal devices 100, and then lets each of the terminal devices 100 carry out a division of the video frame based on the set conference mode.

Here it should be noted that, in different conference modes, since focus areas are different for participants (or users) of the video conference, the divisions of video frames are associated with the conference modes; the focus area of the participants of the video conference include the features of "whiteboard", "talker", etc.

Next details of the division of video frames according to various conference modes are illustrated as follows.

Figure 4:
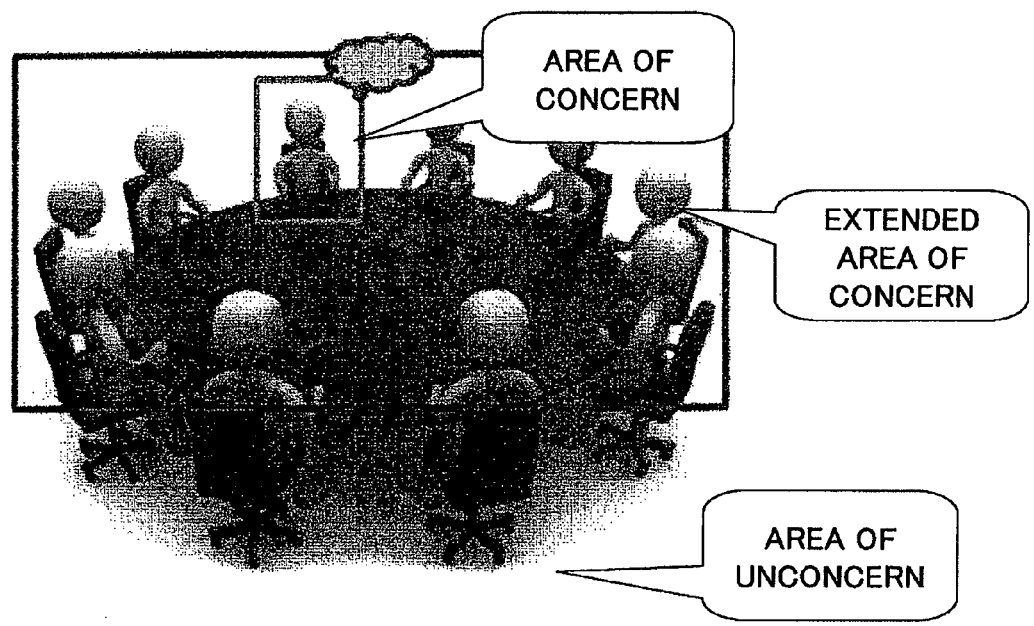
FIG. 4 illustrates an example of division of a video frame in a local terminal device of the video conference system.

For example, in the "presentation mode", if a talker is in the local terminal device 100A, the talker is a common focus area for the participants at two ends (i.e. the local terminal device 100A and the remote terminal devices 100B) of the video conference. In this case, for example, as for the video frame of the local terminal device 100A, the video frame may be divided into three areas based on the "presentation mode", the talker or the face of the talker may be divided as an "area of concern", an area outwardly extended a predetermined distance from the boundary of the area of concern may be divided as an "extended area of concern", and the remaining area may be divided as an "area of unconcern". For example, FIG. 4 illustrates an example of the division of a video frame in the local terminal device 100A. As for the video frame of the remote terminal device 100B, in the above-mentioned case, if there is a talker at the other end (i.e. the local terminal device 100A) and there is no detected feature in the remote terminal devices 100B, this means that the importance of all the contents in the video frames of the remote terminal device 100B is lower than that of the focus area of the current video conference scene (i.e. the talker at the other end). Therefore, at the same time, all the video frames of the remote terminal devices 100B are set as "areas of unconcern" based on the "presentation mode".

Similarly, for example, if there is a talker in the remote terminal device 100B and there is no detected feature in the local terminal device 100A, the video frame of the remote terminal device 100B is divided (i.e. divided into an "area of concern", an "extended area of concern", and an "area of unconcern") based on the "presentation mode". In this case, the whole video frame of the local terminal device 100A is set as an "area of unconcern".

Furthermore, in the "whiteboard mode", if a participant in the local terminal device 100A is writing something on the whiteboard, the content which is being written on the whiteboard is the focus for all the participants of the video conference. As a result, in this mode, as for the video frame of the local terminal device 100A, the video frame is divided into three areas as follows: the content which is being written on the whiteboard is divided as an "area of concern", an area outwardly extended a predetermined distance from the boundary of the area of concern is divided as an "extended area of concern", and the remaining area is divided as an "area of unconcern". In this case, as for the video frames of the remote terminal devices 100B, when the participant is writing something on the whiteboard at the other end (i.e. the local terminal device 100A), the content which is being written on the whiteboard is the focus of all the participants; therefore the importance of all the contents in the video frames of the remote terminal devices 100B is lower than that of the focus area (i.e. the whiteboard) of the current video conference. As a result, at the same time, the whole video frames of the remote terminal devices 100B are set as "areas of unconcern" based on the "whiteboard mode".

Similarly, for example, when a participant in one of the remote terminal devices 100B is writing something on a whiteboard, the video frame of the remote terminal device 100B is divided into an "area of concern", an "extended area of concern", and an "area of unconcern" based on the "whiteboard mode". In this case, the whole video frames of the local terminal device 100A and another remote terminal device 100B are set as an "area of unconcern".

Furthermore, in the "discussion mode", if there are plural talkers who are discussing using terminal devices 100 of the video conference system, the plural talkers who are discussing are the focus area of all the participant of the video conference. As a result, in this mode, if there is a talker taking part in the discussion using the local terminal device 100A, the video frame of the local terminal device 100A is divided into three parts as follows: the talker taking part in the discussion is divided as an "area of concern", an area outwardly extended a predetermined distance from boundary of the area of concern is divided as an "extended area of concern", and the remaining area is set as an "area of unconcern". If there is a talker taking part in the discussion in one of the remote terminal devices 100B too, the video frame of the remote terminal device 100B is divided similarly (i.e., divided into as an "area of concern", an "extended area of concern", and an "area of unconcern"). If there is no talker taking part in the discussion in another remote terminal device 100B, the whole video frame of this remote terminal device 100B is set as an "area of unconcern".

Up to here the video frame of each of the terminal devices 100 may be divided into three kinds of areas i.e. the "area of concern", the "extended area of concern", and the "area of unconcern" based on the features and the conference modes detected at the two ends (i.e. the local terminal device 100A and the remote terminal devices 100B) of the video conference system. Each kind of the areas i.e. the "area of concern", the "extended area of concern", and the "area of unconcern" is included in the divided area of the video frame from at least one terminal device 100. Here the aim of dividing the video frame according to the three kinds of areas is to reduce an edge effect between different areas, and to guarantee that the videos in the different areas of the video frame can be combined smoothly after carrying out the below-mentioned filtering approaches.

Next the pre-processing carried out after the division of the video frames of each of the terminal devices 100 and before the video encoding is illustrated as follows.

After the division of the video frame finishes, each of the terminal devices 100 of the video conference system ranks the divided areas of the video frame. Since the area of concern generally includes a focal content area of common concern to all the participants, this area is given a high priority. Since the extended area of concern is an extension of the area of concern, its priority is lower than that of the area of concern. Furthermore, in general, since the importance of the content included in the area of unconcern is lowest, this area is given a low priority.

Based on the ranked result of priority, the network bandwidth of the terminal devices 100 of the video conference system is re-allocated. For example, the re-allocation of the network bandwidth may be carried out by exchanging information related to the ranked results of priority among the terminal devices 100 of the video conference system. In particular, based on the ranked result of priority, one of the terminal devices 100 having the video frame whose priority is high may occupy relatively wide bandwidth, whereas one of the terminal devices 100 having the video frame whose priority is low may occupy relatively narrow bandwidth. Furthermore the video conference control device 101 may collect the information related to the ranked result of priority of all the terminal devices 100 so as to allocate the bandwidth occupied by the terminal devices 100. It should be noted that the present invention is not limited to this; it is also possible to utilize any bandwidth setting techniques of a dynamic network to carry out the re-allocation of the terminal devices 100.

Aside from this, after carrying out the priority ranking, each of the terminal devices 100 applies a fuzzy filtering approach to the extended area of concern and the area of unconcern in the region of space so as to decrease the high-frequency information of these two areas. Then a filtering approach is applied to the extended area of concern and the area of unconcern in the region of time so as to reduce the difference between two neighboring video frames.

By applying the fuzzy filtering approach to the above-mentioned areas in the region of space, in the next encoding process, after carrying out, for example, a discrete cosine transformation (DCT), the amounts of image information needing to be encoded in the above-mentioned areas are relatively decreased. Similarly, by applying the filtering approach to the above-mentioned areas, in the next encoding process, after carrying out a motion estimate, motion vectors needing to be encoded in the above-mentioned areas are relatively decreased.

In particular, for example, it is possible to utilize a weighted average efficiency filtering approach to carry out the fuzzy filtering applied to the extended area of concern and the area of unconcern. The following equation (1) is an example of the weighted average efficiency filtering approach.

$$g(x, y) = \sum_{i=-n}^{n} \sum_{j=-n}^{n} w(i, j)f(x+i, y+j) \quad (1)$$

Here g(x,y) is the central pixel of a window having (2n+1)×(2n+1) pixels, w(i,j) is a weighted value, and f(x+i,y+j) is the pixel value of the pixel in the window.

By this way, the original value of the central pixel is replaced by the weighted average efficiency of the (2n+1)×(2n+1) pixels in the window so as to carry out the weighted average efficiency filtering (i.e. the fuzzy filtering).

Furthermore weighted average efficiency filters applied to the extended area of concern and the area of unconcern may be different types of filters having different parameters. For example, a weighted average efficiency filter shown in FIG. 6A may be applied to the extended area of concern, and a weighted average efficiency filter shown in FIG. 6B may be applied to the area of unconcern; here matrices shown in FIG. 6A and FIG. 6B are matrix formats of the weighted value w(i,j).

Figure 5:
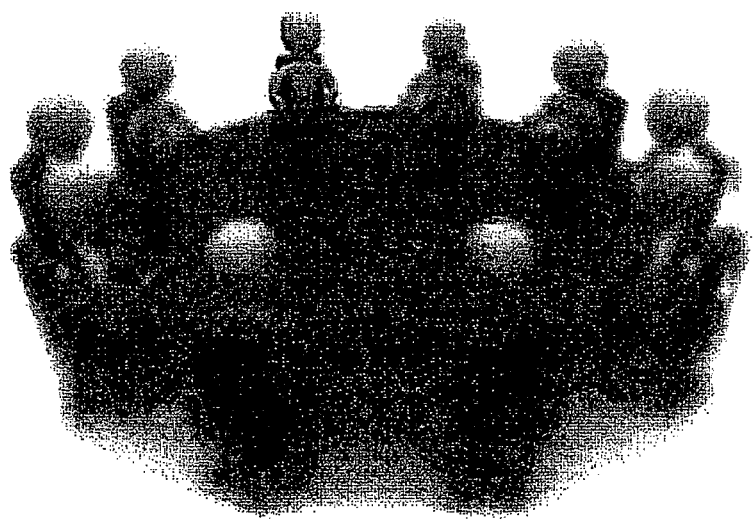
FIG. 5 illustrates an example of applying fuzzy processing to the video frame shown in FIG. 4.

After carrying out the fuzzy filtering by utilizing the weighted average efficiency filtering approach in the region of space, in a case where it is supposed that the original video frame is shown in FIG. 4, the filtered result is shown in FIG. 5. Except for the above-mentioned weighted average efficiency filtering approach, the median filtering approach and the Gaussian filtering approach may also be applied to the extended area of concern and the area of unconcern for carrying out the fuzzy filtering.

Furthermore, as for the filtering in the region of time, the filtering of the extended area of concern may be obtained by calculating a linear interpolation value of the corresponding areas of concern in two neighboring video frames, whereas the filtering of the area of unconcern may be obtained by copying the content of the corresponding area in the previous video frame, i.e., as for every two or more than two video frames, the areas of unconcern in one or plural video frames therein are skipped, respectively. This filtering approach carried out in the region of time is shown in FIG. 6C.

By applying filtering to the divided areas (i.e. the extended area of concern and the area of unconcern) of the video frames in the region of space and the region of time, the amount of information of the video frame of each of the terminal devices 100 is decreased obviously; in this way, the amount of data transferred in the network for building the video conference is decreased. As a result, the network bandwidth can be further saved by the above-mentioned region-of-space filtering and region-of-time filtering. Therefore even in a network having a low transfer speed, the video conference system and the processing method according to the embodiments of the present invention can build a stable and smooth video conference.

Next the details of the processing after the pre-processing process (for example, the ranking process, the filtering process, etc.) applied to the divided areas of the video frame are illustrated as follows.

Each of the terminal devices 100 carries out an encoding process applied to the pre-processed video frame. Since the ranking process, the filtering process, etc. are carried out in the pre-processing stage, the embodiments of the present invention may be applied to any conventional encoder and coder decoder (CODEC), and it is not necessary to make any modification to the conventional encoder and CODEC. Here, as a result, the concrete description of the structures and the operations of the conventional encoder and CODEC operations are omitted.

In what follows, a video conference system according to another embodiment of the present invention is illustrated as follows.

Figure 7:
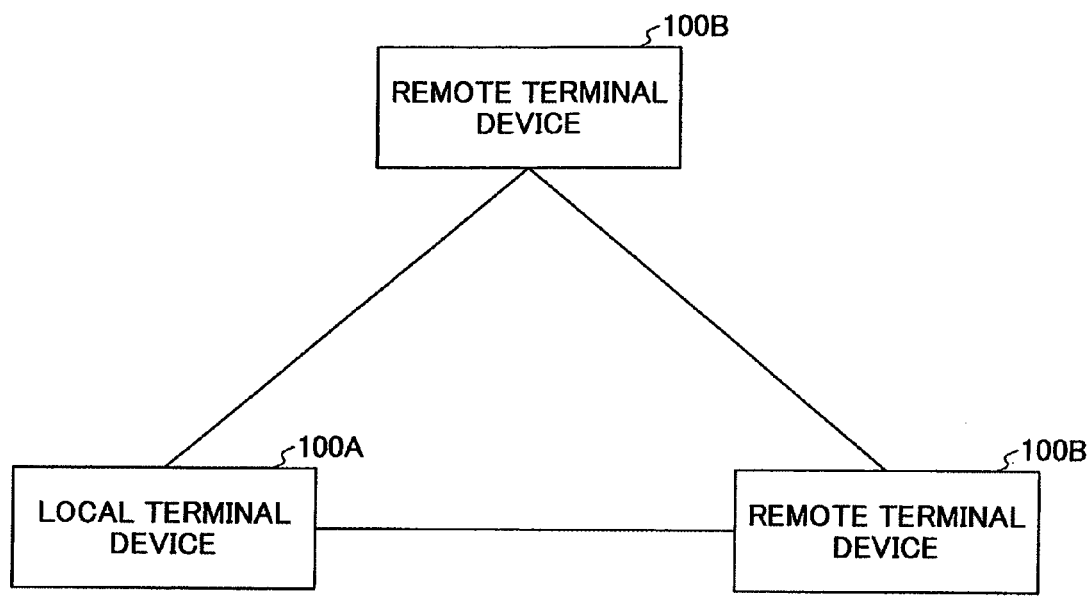
FIG. 7 is a block diagram of a video conference system according to another embodiment of the present invention.

FIG. 7 is a block diagram of the video conference system according to the other embodiment of the present invention.

In a video conference system shown in FIG. 7, the video conference controller 101 as shown in FIG. 1 is not included. In this embodiment, a conference mode is set based on a feature detection carried out in a local terminal devices 100A and a remote terminal devices 100B, respectively; here information related to the feature detection results are exchanged among the local terminal devices 100A and the remote terminal devices 100B, i.e., it is not necessary to use the video conference controller 101 as shown in FIG. 1. The corresponding pre-processing process is carried out by the same way. Here it should be noted that since processes except the information exchanging process among the local terminal device 100A and the remote terminal device 100B are the same with those illustrated in the above-mentioned embodiment, the processes are omitted.

According to this embodiment, after carrying out the feature detections in the local terminal device 100A and the remote terminal device 100B, the local terminal device 100A, based on any protocol (for example, the TCP/IP protocol, the UDP protocol, etc.) used for transferring data, sends a request to the remote terminal devices 100B for obtaining the features of the video frames of the remote terminal devices 100B, and then receives response information (i.e. the information related to the features of the video frames) from the remote terminal devices 100B, respectively; by the same way, the remote terminal devices 100B may also obtain response information from the local terminal device 100A, respectively.

After that, the local terminal device 100A combines the information related to the features of the video frame of itself and the information related to the features of the video frames of the remote terminal devices 100B; then the local terminal device 100A sets the conference mode for the current video conference scene, and then carries out the corresponding pre-processing process based on the set conference mode. By the same way, the remote terminal devices 100B may also set the conference mode for the current video conference scenes, and then carry out the corresponding processing process, respectively.

Furthermore, according to one more embodiment of the present invention, a user may adjust the quality of the current video of the local terminal device 100A by exchanging information between an input/output interface (not shown in the drawings) disposed on the local terminal device 100A and the local terminal device 100A; by the same way, users may also adjust the qualities of the current videos of the remote terminal devices 100B, respectively.

For example, if a user wants to adjust the quality of the current video in the local terminal device 100A, the user may adjust the parameters of the filters used in the region of space and the region of time, and then the local terminal device 100A carries out the filtering operations based on the adjusted parameters. For example, as for a weighted average efficiency fuzzy filter having a n×n matrix ($n^2$ refers to the number of elements of the matrix), as shown in FIG. 3(2) (the value of n is 5, and the denominator is $n^2=25$), the greater the value of n is, the more apparent the effect of fuzzy filtering is. A weighted average efficiency fuzzy filter shown in FIG. 3(1) has the same attribute. Therefore, by increasing the value of the parameter n, it is possible to further decrease the qualities of the area of unconcern and the extended area of unconcern. As a result, the amount of data after encoding may be decreased, and the bandwidth may be saved. Consequently the quality of the area of concern may be increased, and the user may observe a more clear focal content.

Various embodiments according to the present invention are concretely illustrated above. By utilizing the above-mentioned video conference system and the processing method of the area of concern in the video conference system, the conference mode can be set based on the results of feature detection carried out at the two ends (i.e. terminal devices) of the video conference system. During the whole conduction period of the video conference, with the change of scene of the video conference, the current focus may be changed too; therefore, as for each conference mode, the current focus (i.e. the area of concern) is taken out by carrying out a division, and given high priority. As a result, by carrying out the above-mentioned operations, clear and high-quality focal content can be automatically and flexibly obtained and provided to the participants of the video conference.

Furthermore, since the bit re-allocation is carried out at two levels based on the divisions of video frames, respectively, i.e., first the re-allocation of bandwidth is carried out at the level of the local terminal device and the remote terminal device; second the re-allocation of bits is carried out at the level of the video frame, and the current network bandwidth can be utilized efficiently by carrying out the above-mentioned operations; as a result, clear and high-quality video can be provided to the participants of the video conference.

In addition, it should be noted that the embodiments of the present invention may be executed by various approaches such as a whole hardware approach, a whole software approach, or a combination of them. For example, in some embodiments of the present invention, software such as firmware, built-in software, micro-code, etc. may be used; however, the embodiments of the present invention are not limited to this. Furthermore the embodiments of the present invention may be realized by a computer program according to the processing method of the embodiments of the present invention; the computer program can be executed by a computer or any instruction execution system. The computer program may be stored in a machine-readable medium such as a semi-conductor or solid memory, a magnetic tape, a loadable disk, an un-installable computer magnetic disk, a random access memory (RAM), a read-only memory (ROM), a hard disk, a floppy disk, etc.

While the present invention is described with reference to the specific embodiments chosen for purpose of illustration, it should be apparent that the present invention is not limited to these embodiments, but numerous modifications could be made thereto by those skilled in the art without departing from the basic concept and scope of the present invention.

The present application is based on Chinese Priority Patent Application No. 201010116447.7 filed on Feb. 25, 2010, the entire contents of which are hereby incorporated by reference.

What is claimed is:

1. A processing method used in a video conference system having a local terminal device and at least one remote terminal device, comprising:

a feature detection step of, when conducting a video conference by using the video conference system, carrying out a feature detection in the local terminal device and the remote terminal device of the video conference system, respectively;

a conference mode setting step of, based on feature detection results of the local terminal device and the remote terminal device, setting a conference mode with regard to a current video conference scene of the video conference system for the local terminal device and the remote terminal device, respectively;

a video encoding step of, based on the conference mode, carrying out a division of a video frame in the local terminal device and the remote terminal device, and then pre-processing divided areas so as to carry out a video encoding for encoding pre-processed areas, respectively; and a priority ranking step of, after the division of the video frame, carrying out a priority ranking of the divided areas of the video frame.

2. The processing method according to claim 1, wherein:
a feature detected in the local terminal device and the remote terminal device of the video conference system includes at least one focus area, and the focus area includes at least one whiteboard and at least one talker.

3. The processing method according to claim 1, wherein:
if the video frame includes a focus area, the video frame is divided into an area of concern, an extended area of concern, and an area of unconcern; and
if the video frame does not include a focus area, the whole video frame is set as an area of unconcern.

4. The processing method according to claim 3, wherein, the priority ranking step comprises:
a step of giving the area of concern a highest priority;
a step of giving the extended area of concern a higher priority; and
a step of giving the area of unconcern a lowest priority.

5. The processing method according to claim 1, further comprising:
a re-allocation step of, based on priority ranking results, re-allocating a network bandwidth of the video conference system.

6. The processing method according to claim 5, wherein:
the re-allocating a network bandwidth of the video conference system includes a bandwidth allocation between the local terminal device and the remote terminal device of the video conference system as well as a bit re-allocation of the video frame.

7. The processing method according to claim 6, wherein:
if the video frame includes a focus area, the video frame is divided into an area of concern, an extended area of concern, and an area of unconcern;
if the video frame does not include a focus area, the whole video frame is set as an area of unconcern; and
a fuzzy filtering is applied to the extended area of concern and the area of unconcern so as to carry out the bit re-allocation of the video frame.

8. The processing method according to claim 7, wherein:
the fuzzy filtering in a region of space includes at least one of a median filtering, an averaging filtering, and a Gaussian filtering.

9. The processing method according to claim 6, wherein:
if the video frame includes a focus area, the video frame is divided into an area of concern, an extended area of concern, and an area of unconcern;
if the video frame does not include a focus area, the whole video frame is set as an area of unconcern; and a region-of-time filtering is applied to the extended area of concern and the area of unconcern so as to carry out the bit re-allocation of the video frame.

10. The processing method according to claim 9, wherein:
the region-of-time filtering applies a linear interpolation with a weighted value to the corresponding area of concern in at least two neighboring video frames.

11. The processing method according to claim 1, wherein:
the conference mode setting step is performed by a control device connected to the local terminal device and the at least one remote terminal device.

12. A video conference system comprising:
a local terminal device; and
at least one remote terminal device,
wherein,
during a period of a video conference, the local terminal device and the remote terminal device carry out a feature detection, respectively, information related to the feature detection is exchanged between the local terminal device and the remote terminal device; based on feature detection results of the local terminal device and the remote terminal device, a conference mode with regard to a current video conference scene in the video conference system is set for the local terminal device and the remote terminal device, respectively, based on the conference mode, a division of a video frame is carried out in the local terminal device and the remote terminal device; then divided areas are pre-processed so as to carrying out a video encoding for encoding pre-processed areas, respectively, and after the division of the video frame, a priority ranking of the divided areas of the video frame is carried out.

13. A non-transitory machine-readable medium having machine-executable instructions for execution by a processing system, wherein, the machine-executable instructions are used for carrying out a processing in a video conference system including a local terminal device and at least one remote terminal device, and the machine-executable instructions, when executed, cause the processing system to carry out:

a feature detection step of, when conducting a video conference by using the video conference system, carrying out a feature detection in the local terminal device and the remote terminal device of the video conference system, respectively;

a conference mode setting step of, based on feature detection results of the local terminal device and the remote terminal device, setting a conference mode with regard to a current video conference scene in the video conference system for the local terminal device and the remote terminal device, respectively; and a video encoding step of, based on the conference mode, carrying out a division of a video frame in the local terminal device and the remote terminal device, and then pre-processing divided areas so as to carry out a video encoding for encoding pre-processed areas, respectively; and a priority ranking step of, after the division of the video frame, carrying out a priority ranking of the divided areas of the video frame.

* * * * *